US012574198B2

(12) United States Patent

Abdelghaffar et al.

(10) Patent No.: US 12,574,198 B2

(45) Date of Patent: Mar. 10, 2026

(54) TECHNIQUES FOR SUB-BAND FULL-DUPLEX MODE AWARE COMMUNICATION

(71) Applicant: QUALCOMM Incorporated, San Diego, CA (US)

(72) Inventors: Muhammad Sayed Khairy Abdelghaffar, San Jose, CA (US); Mostafa Khoshnevisan, San Diego, CA (US); Abdelrahman Mohamed Ahmed Mohamed Ibrahim, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 18/188,826

(22) Filed: Mar. 23, 2023

(65) Prior Publication Data

US 2024/0322989 A1     Sep. 26, 2024

(51) Int. Cl.
*H04L 5/14*       (2006.01)
*H04L 5/00*       (2006.01)

(52) U.S. Cl.
CPC ............. *H04L 5/14* (2013.01); *H04L 5/0035* (2013.01); *H04L 5/0051* (2013.01)

(58) Field of Classification Search
CPC ........ H04L 5/14; H04L 5/0035; H04L 5/0051
See application file for complete search history.

(56) References Cited

U.S. PATENT DOCUMENTS

| | | | |
|---|---|---|---|
| 2022/0400501 A1* | 12/2022 | Kang | H04L 1/1861 |
| 2023/0147122 A1* | 5/2023 | Canonne-Velasquez | H04L 1/08 370/329 |
| 2024/0097866 A1* | 3/2024 | Nemeth | H04L 5/1469 |
| 2024/0155583 A1* | 5/2024 | Rudolf | H04L 5/14 |
| 2025/0226852 A1* | 7/2025 | Lu | H04L 5/14 |
| 2025/0226925 A1* | 7/2025 | Li | H04L 1/1812 |
| 2025/0266979 A1* | 8/2025 | Seok | H04L 5/0048 |

FOREIGN PATENT DOCUMENTS

| | | |
|---|---|---|
| WO | WO-2022011159 A1 | 1/2022 |
| WO | WO-2022160204 A1 | 8/2022 |

OTHER PUBLICATIONS

International Search Report and Written Opinion—PCT/US2024/017617—ISA/EPO—Jul. 15, 2024.

* cited by examiner

*Primary Examiner* — Derrick V Rose

(74) *Attorney, Agent, or Firm* — Harrity & Harrity LLP/Qualcomm Incorporated

(57)          ABSTRACT

Various aspects of the present disclosure generally relate to wireless communication. In some aspects, a user equipment (UE) may receive, from a first transmit receive point (TRP) of a multi-TRP with a full-duplex mode, spatial relationship information associated with a sub-band full-duplex (SBFD) mode. The UE may transmit, to the first TRP or a second TRP of the multi-TRP, one or more communications using the spatial relationship information associated with the SBFD mode. Numerous other aspects are described.

30 Claims, 16 Drawing Sheets

600

600

600

710 — Receive, from a first TRP of a multi-TRP with a full-duplex mode, spatial relationship information associated with an SBFD mode 720 — Transmit, to the first TRP or a second TRP of the multi-TRP, one or more communications using the spatial relationship information associated with the SBFD mode

700

810    Transmit, using a first TRP of a multi-TRP with a full-duplex mode, spatial relationship information associated with an SBFD mode 820    Receive, at the first TRP of the multi-TRP, one or more communications using the spatial relationship information associated with the SBFD mode

800

TECHNIQUES FOR SUB-BAND FULL-DUPLEX MODE AWARE COMMUNICATION

FIELD OF THE DISCLOSURE

Aspects of the present disclosure generally relate to wireless communication and to techniques and apparatuses for sub-band full-duplex mode aware communication.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving, from a first transmit receive point (TRP) of a multi-TRP with a full-duplex mode, spatial relationship information associated with a sub-band full-duplex (SBFD) mode. The method may include transmitting, to the first TRP or a second TRP of the multi-TRP, one or more communications using the spatial relationship information associated with the SBFD mode.

Some aspects described herein relate to a method of wireless communication performed by a network node. The method may include transmitting, using a first TRP of a multi-TRP with a full-duplex mode, spatial relationship information associated with an SBFD mode. The method may include receiving, at the first TRP of the multi-TRP, one or more communications using the spatial relationship information associated with the SBFD mode.

Some aspects described herein relate to a UE for wireless communication. The UE may include a memory and one or more processors coupled to the memory. The one or more processors may be configured to receive, from a first TRP of a multi-TRP with a full-duplex mode, spatial relationship information associated with an SBFD mode. The one or more processors may be configured to transmit, to the first TRP or a second TRP of the multi-TRP, one or more communications using the spatial relationship information associated with the SBFD mode.

Some aspects described herein relate to a network node for wireless communication. The network node may include a memory and one or more processors coupled to the memory. The one or more processors may be configured to transmit, using a first TRP of a multi-TRP with a full-duplex mode, spatial relationship information associated with an SBFD mode. The one or more processors may be configured to receive, at the first TRP of the multi-TRP, one or more communications using the spatial relationship information associated with the SBFD mode.

Some aspects described herein relate to a non-transitory computer-readable medium that stores a set of instructions for wireless communication by a UE. The set of instructions, when executed by one or more processors of the UE, may cause the UE to receive, from a first TRP of a multi-TRP with a full-duplex mode, spatial relationship information associated with an SBFD mode. The set of instructions, when executed by one or more processors of the UE, may cause the UE to transmit, to the first TRP or a second TRP of the multi-TRP, one or more communications using the spatial relationship information associated with the SBFD mode.

Some aspects described herein relate to a non-transitory computer-readable medium that stores a set of instructions for wireless communication by a network node. The set of instructions, when executed by one or more processors of the network node, may cause the network node to transmit, using a first TRP of a multi-TRP with a full-duplex mode, spatial relationship information associated with an SBFD mode. The set of instructions, when executed by one or more processors of the network node, may cause the network node to receive, at the first TRP of the multi-TRP, one or more communications using the spatial relationship information associated with the SBFD mode.

Some aspects described herein relate to an apparatus for wireless communication. The apparatus may include means for receiving, from a first TRP of a multi-TRP with a full-duplex mode, spatial relationship information associated with an SBFD mode. The apparatus may include means for transmitting, to the first TRP or a second TRP of the multi-TRP, one or more communications using the spatial relationship information associated with the SBFD mode.

Some aspects described herein relate to an apparatus for wireless communication. The apparatus may include means for transmitting, using a first TRP of a multi-TRP with a full-duplex mode, spatial relationship information associated with an SBFD mode. The apparatus may include means for receiving, at the first TRP of the multi-TRP, one or more communications using the spatial relationship information associated with the SBFD mode.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
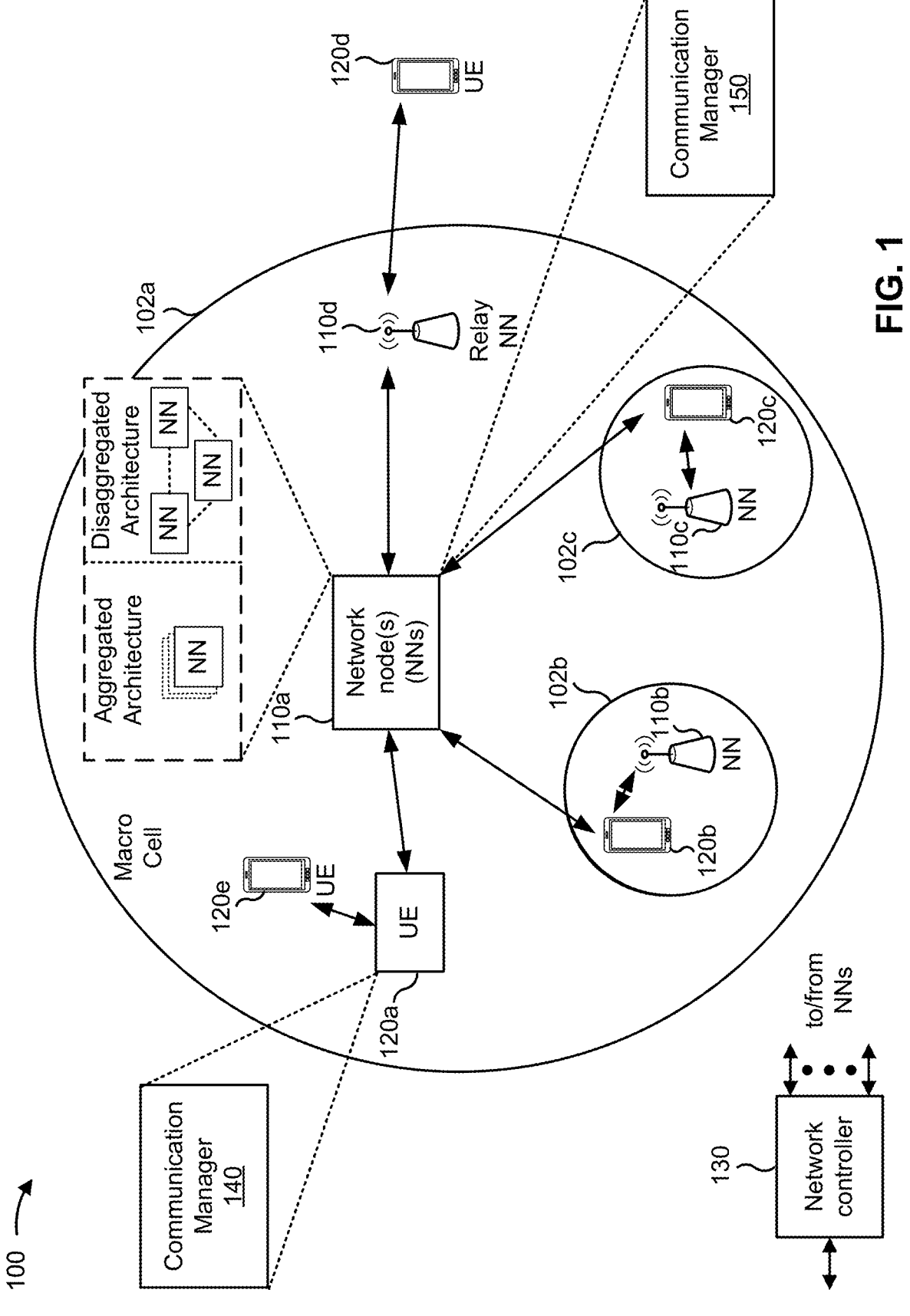
FIG. 1 is a diagram illustrating an example of a wireless network.

Some communications systems provide for full-duplex communications by a network node or a user equipment (UE). For example, in full-duplex operation at a network node, the network node may receive communications on an uplink from a first UE and transmit communications on a downlink to a second UE. When sub-bands for the uplink and the downlink are non-overlapping, the full-duplex operation is referred to as a "sub-band full-duplex" or "SBFD" mode. On a UE-side, each UE (e.g., the first UE and the second UE) may operate in a half-duplex mode. In some cases, the UE may be referred to as "SBFD aware" or performing "SBFD mode aware" communications. In other words, when the UE is signaled with information associated with the SBFD mode, such as information identifying SBFD symbols or slots and downlink or uplink sub-band locations within the SBFD symbols or slots, the UE is SBFD aware (of network node full-duplex operation), although the UE is operating in a half-duplex mode.

To achieve full-duplex operations, such as in an SBFD mode, a network node may include a set of transmit receive points (TRPs) in a multiple TRP (multi-TRP) deployment. In other words, one full-duplex network node may include a first TRP for downlink communications with a first UE and a second TRP for uplink communications with a second UE. The first TRP and the second TRP may have spatially isolated antenna panels to avoid self-interference and obviate a need for, for example, electromagnetic isolators. When communication repetition is enabled for a UE in a multi-TRP SBFD deployment, the UE may have an active TCI state and may use the active TCI state for repetition of a set of communications. In some of these scenarios, the UE may be configured to transmit a first repetition of a communication in an SBFD symbol and a second repetition of the communication in a non-SBFD symbol. Alternatively, the UE may be configured for periodic or semi-persistent uplink transmission or downlink reception. In such scenarios, a best TRP (e.g., in terms of resource availability and/or link quality) may not be available for some communications. For example, although a first TRP is a best TRP for a first UE for both downlink and uplink, the first TRP may only be available for downlink communications during SBFD symbols. In this scenario, among other examples, the active TCI state that is signaled to the UE may not be usable in connection with a directionality of the link resources.

Some aspects described herein enable spatial relationship indication for SBFD aware UEs. For example, a UE may receive spatial relationship information that is associated with a full-duplex mode of a network node, such as spatial relationship information configured for SBFD symbols or slots. In this case, the UE may use the spatial relationship information for communicating with the network node, such as for transmitting one or more communications associated with the SBFD mode. In this way, the UE may avoid issues (such as dropped or interrupted communications) associated with spatial information not being applicable to a directionality associated with the SBFD mode.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110)

may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1

(52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a first TRP of a multi-TRP with a full-duplex mode, spatial relationship information associated with a sub-band full-duplex (SBFD) mode; and transmit, to the first TRP or a second TRP of the multi-TRP, one or more communications using the spatial relationship information associated with the SBFD mode. Additionally, or alternatively, the communication manager 140 may perform one or more other operations described herein.

In some aspects, the network node 110 may include a communication manager 150. As described in more detail elsewhere herein, the communication manager 150 may transmit, using a first TRP of a multi-TRP with a full-duplex mode, spatial relationship information associated with an SBFD mode; and receive, at the first TRP of the multi-TRP, one or more communications using the spatial relationship information associated with the SBFD mode. Additionally, or alternatively, the communication manager 150 may perform one or more other operations described herein.

As indicated above, FIG. 1 is provided as an example. Other examples may differ from what is described with regard to FIG. 1.

Figure 2:
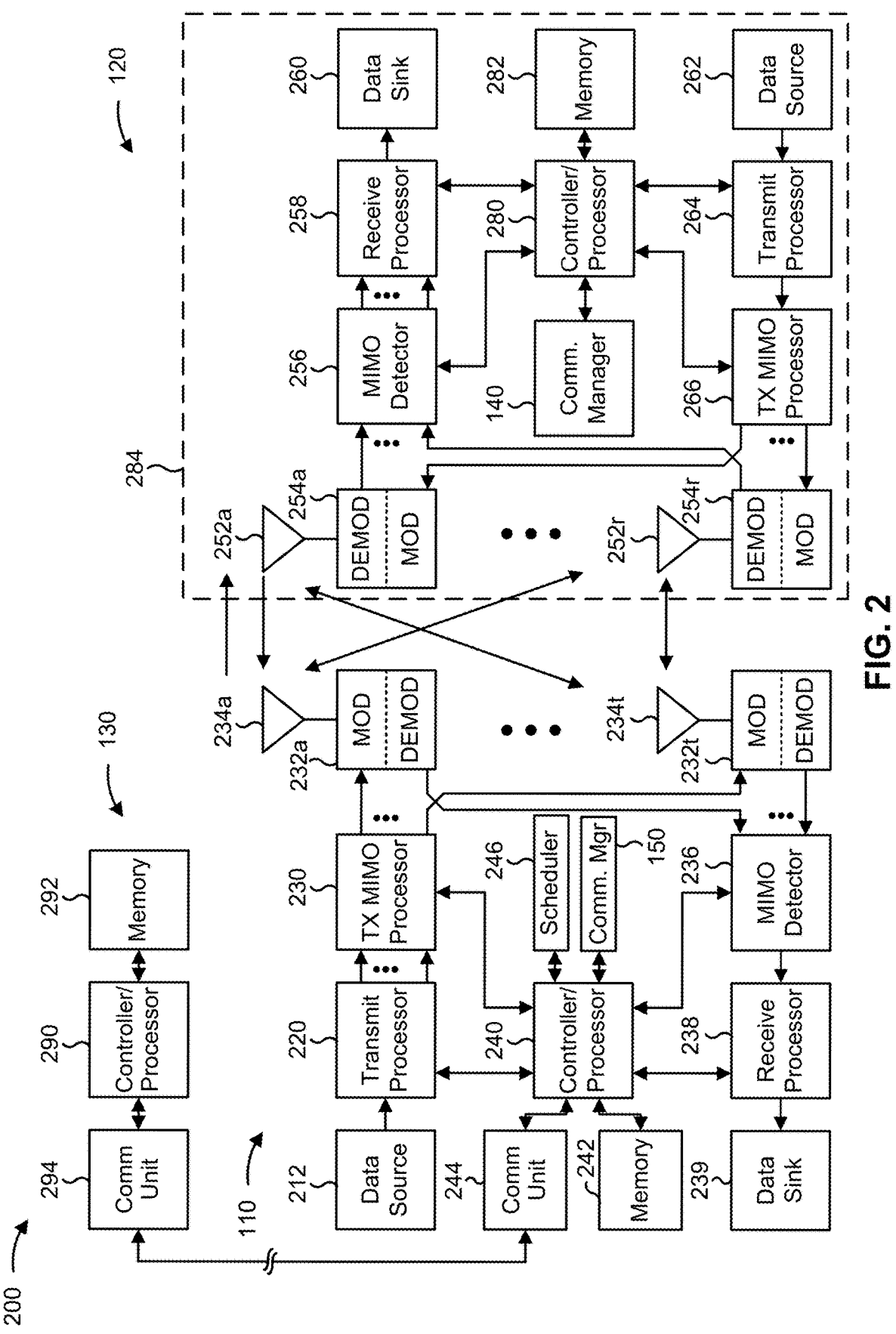
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 6A-10).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 6A-10).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with SBFD mode aware communication, as described in more detail elsewhere herein. For example, the controller/processor 240 of the network node 110, the controller/processor 280 of the UE 120, or any other component(s) (or combinations of components) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a first TRP of a multi-TRP with a full-duplex mode, spatial relationship information associated with an SBFD mode; and/or means for transmitting, to the first TRP or a second TRP of the multi-TRP, one or more communications using the spatial relationship information associated with the SBFD mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, using a first TRP of a multi-TRP with a full-duplex mode, spatial relationship information associated with an SBFD mode; and/or means for receiving, at the first TRP of the multi-TRP, one or more communications using the spatial relationship information associated with the SBFD mode. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
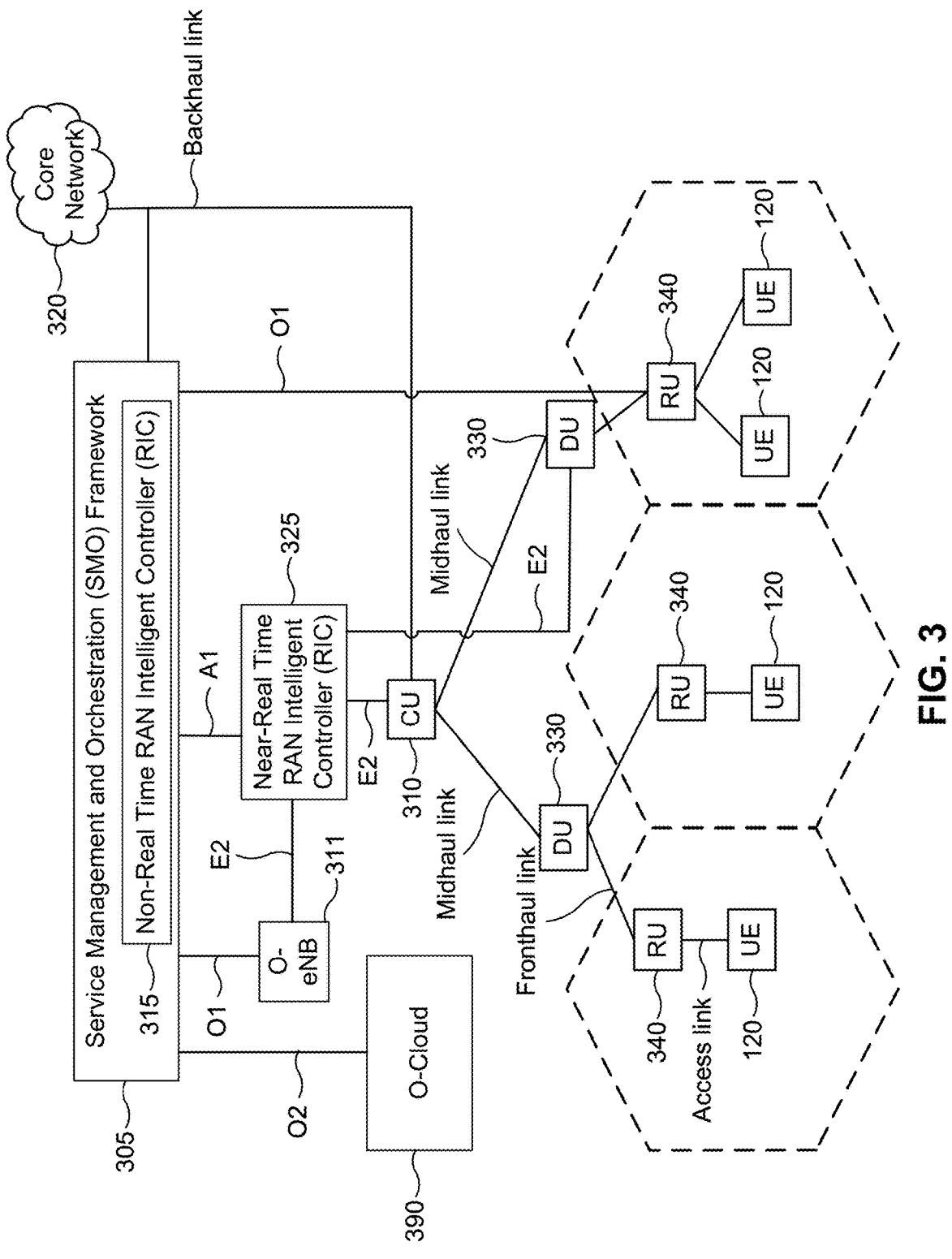
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
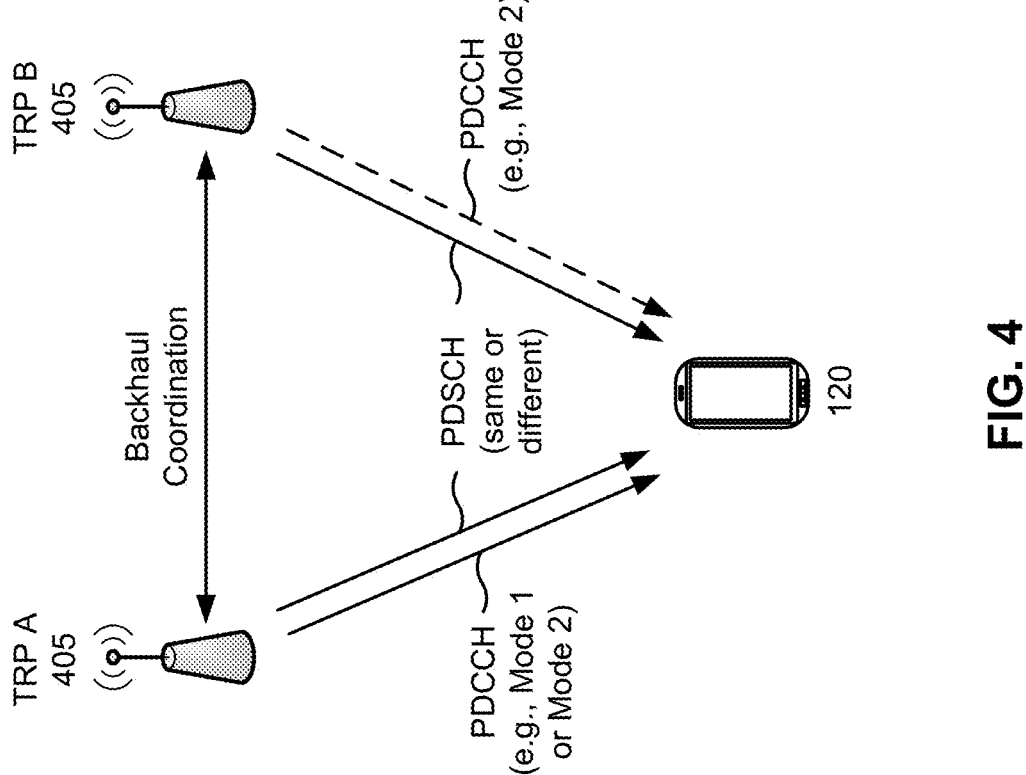
FIG. 4 is a diagram illustrating an example of multiple transmit receive point (multi-TRP) communication (sometimes referred to as multi-panel communication), in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a network node 110 or a component thereof described above in connection with FIGS. 1-3.

In some cases, a TRP 405 may be referred to as a cell, a panel, an antenna array, or an array. A TRP 405 may be connected to a single access node controller or to multiple access node controllers. In some examples, a dynamic configuration of split logical functions may be present within the architecture of a distributed RAN, referred to elsewhere herein as a functional split. For example, a packet data convergence protocol (PDCP) layer, a radio link control (RLC) layer, and/or a medium access control (MAC) layer may be configured to terminate at the access node controller or at a TRP 405.

In some examples, multiple TRPs 405 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some examples, a TCI state may be used to indicate one or more QCL relationships. A TRP 405 may be configured to individually (e.g., using dynamic selection) or jointly (e.g., using joint transmission with one or more other TRPs 405) serve traffic to a UE 120.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller). The interface may have a smaller delay and/or higher capacity when the TRPs 405 are co-located at the same network node 110 (e.g., when the TRPs 405 are different antenna arrays or panels of the same network node 110), and may have a larger delay and/or lower capacity (as compared to co-location) when the TRPs 405 are located at different network nodes 110. The different TRPs 405 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some examples, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
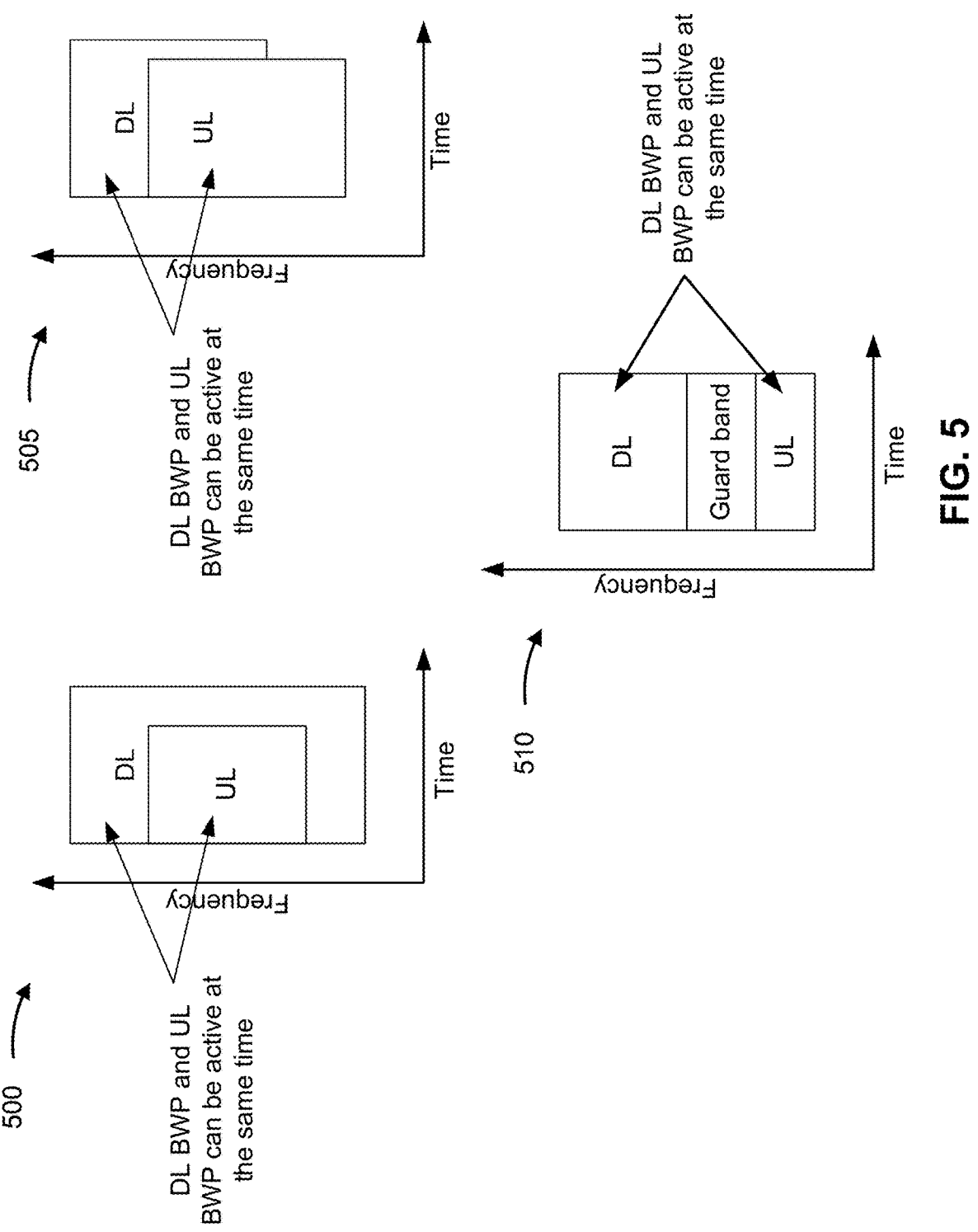
FIG. 5 is a diagram illustrating examples of full-duplex communication in a wireless network, in accordance with the present disclosure.

FIG. 5 is a diagram illustrating examples 500, 505, and 510 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 5, examples 500 and 505 show examples of in-band full-duplex (IBFD) communication. In IBFD, a UE may transmit an uplink communication to a base station and receive a downlink communication from the base station on the same time and frequency resources. As shown in example 500, in a first example of IBFD, the time and frequency resources for uplink communication may fully overlap with the time and frequency resources for downlink communication. As shown in example 505, in a second example of IBFD, the time and frequency resources for uplink communication may partially overlap with the time and frequency resources for downlink communication.

As further shown in FIG. 5, example 510 shows an example of sub-band full-duplex (SBFD) communication, which may also be referred to as "sub-band frequency division duplex (SBFD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

As indicated above, FIG. 5 is provided as an example. Other examples may differ from what is described with respect to FIG. 5.

Some communications systems provide for full-duplex communications by a network node or a UE. For example, in full-duplex operation at a network node, the network node may receive communications on an uplink from a first UE and transmit communications on a downlink to a second UE. When sub-bands for the uplink and the downlink are non-overlapping, the full-duplex operation is referred to as a "sub-band full-duplex" or "SBFD" mode. On a UE-side, each UE (e.g., the first UE and the second UE) may operate in a half-duplex mode. In some cases, the UE may be referred to as "SBFD aware" or performing "SBFD mode aware" communications. In other words, when the UE is signaled with information associated with the SBFD mode, such as information identifying SBFD symbols or slots and downlink or uplink sub-band locations within the SBFD symbols or slots, the UE is SBFD aware (of network node full-duplex operation), although the UE is operating in a half-duplex mode. In this case, a network node may transmit an RRC message indicating a duplex mode (e.g., in addition to cell-specific or cell-common parameters for time and frequency locations of uplink and downlink sub-bands). The RRC message, in some examples, indicates the full duplex mode by the network either using physical co-located or non-co-located panels.

To achieve full-duplex operations, such as in an SBFD mode, a network node may include a set of TRPs in a multiple TRP (multi-TRP) deployment. In other words, one full-duplex network node may include a first TRP for downlink communications with a first UE and a second TRP for uplink communications with a second UE. The first TRP and the second TRP may have spatially isolated antenna panels to avoid self-interference and obviate a need for, for example, electromagnetic isolators. In this case, the first TRP and the second TRP are co-located within a single network node. In another example, a distributed network node may include non-co-located TRPs. For example, rather than having a plurality of panels corresponding to the plurality of TRPs in a single housing or closely positioned housings, non-co-located TRPs may have panels that are physically separated by more than a threshold distance. As a result, and based on the panels having a fixed direction during SBFD symbols, some beams or spatial directionalities may not be available during SBFD symbols, as described below.

When communication repetition is enabled for a UE in a multi-TRP SBFD deployment, the UE may have an active TCI state and may use the active TCI state for repetition of a set of communications. In some of these scenarios, the UE may be configured to transmit a first repetition of a communication in an SBFD symbol and a second repetition of the communication in a non-SBFD symbol. Alternatively, the UE may be configured for periodic or semi-persistent uplink transmission or downlink reception across SBFD and non-SBFD symbols. In such scenarios, a best TRP (e.g., in terms of resource availability and/or link quality) may not be available for some communications in SBFD symbols. For example, although a first TRP is a best TRP for a first UE for both downlink and uplink, the first TRP may only be available for downlink communications during SBFD symbols. In this scenario, among other examples, the active TCI state that is signaled to the UE may not be usable in connection with a directionality of the link resources.

Some aspects described herein enable spatial relationship indication for SBFD aware UEs. For example, a UE may receive spatial relationship information that is associated with a full-duplex mode of a network node, such as spatial relationship information configured for SBFD symbols or slots, as described in more detail below. In this case, the UE may use the spatial relationship information (or an uplink (UL) transmission configuration indicator (TCI) or beam) for communicating with the network node, such as for transmitting one or more communications associated with the SBFD mode. In this way, the UE may avoid issues (such as dropped or interrupted communications) associated with spatial information not being applicable to a directionality associated with the SBFD mode.

Figure 6A:
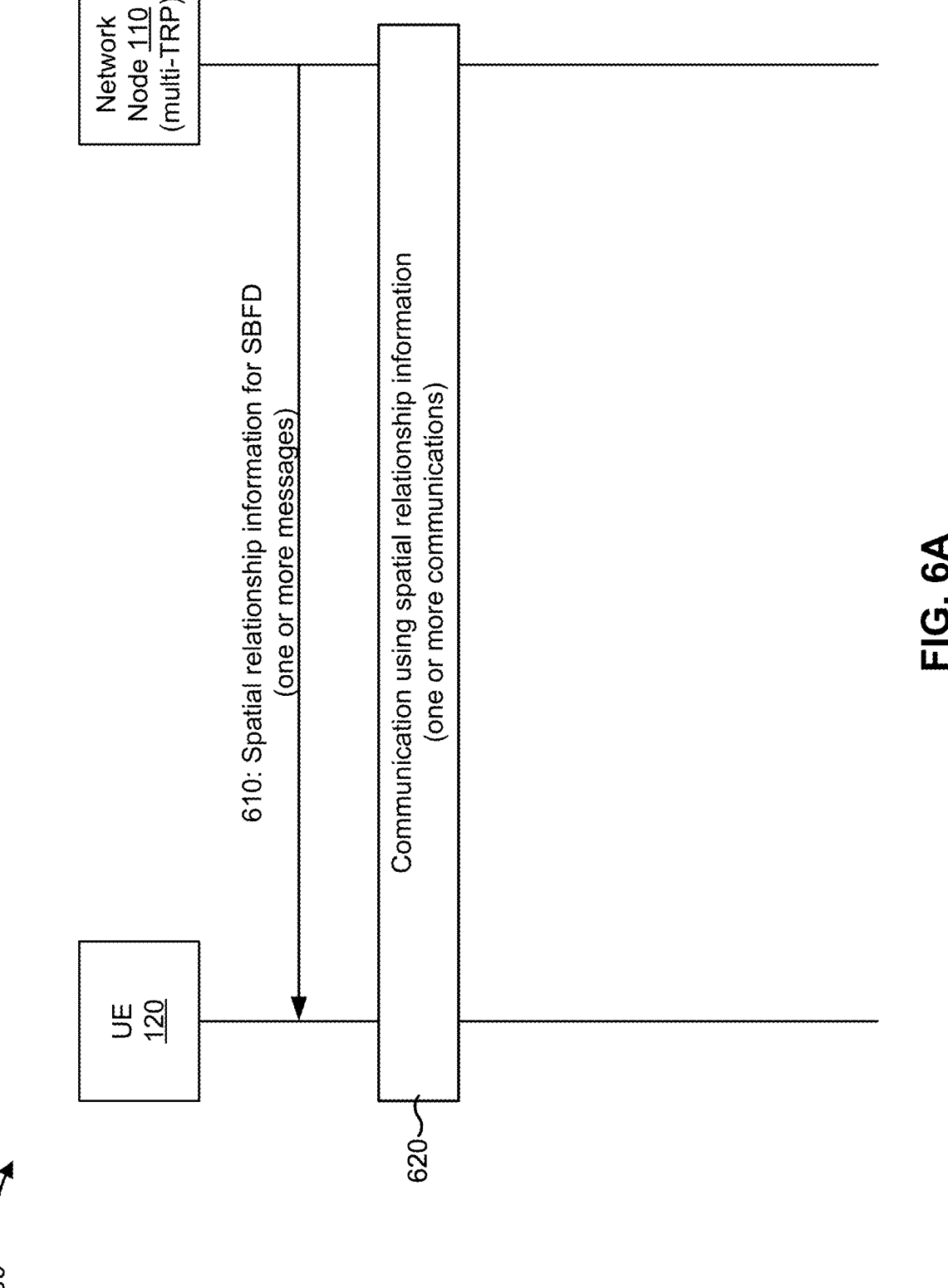
FIGS. 6A-6G are diagrams illustrating an example associated with sub-band full-duplex (SBFD) mode aware communication, in accordance with the present disclosure.

FIGS. 6A-6G are diagrams illustrating an example 600 associated with SBFD mode aware communication, in accordance with the present disclosure. As shown in FIG. 6A, example 600 includes communication between a network node 110 (e.g., TRPs of a multi-TRP with a full-duplex mode) and a UE 120.

As further shown in FIG. 6A, and by reference number 610, the UE 120 may receive spatial relationship information associated with an SBFD mode. For example, when the network node 110 is operating in an SBFD mode type of full-duplex mode, the network node may transmit spatial relationship information associated with the SBFD mode. For example, the spatial relationship information may include information indicating that some TCI states, beams, or UL spatial filters are not to be used (e.g., not-available or restricted) in SBFD symbols. The restriction of the UL beams can be signaled to a SBFD-aware UE 120 via RRC messages or via medium access control (MAC) control element (CE) (MAC-CE) signaling. Additionally, or alternatively, the spatial relationship information may include up to two spatial relation information indicators or two beams for UL communication in SBFD and non-SBFD symbols.

In some aspects, the UE 120 may receive spatial relationship information associated with identifying a directionality of a slot. For example, when the UE 120 is an SBFD aware UE that is being configured with RRC signaling (e.g., CG-PUSCH or PUCCH) or indicated with dynamic grant (DG) signaling for uplink repetition (e.g., of a physical uplink control channel (PUCCH), physical uplink shared channel (PUSCH), or physical random access channel (PRACH) across SBFD symbols and non-SBFD symbols, the UE 120 may receive spatial relationship information indicating a slot definition (e.g., a slot directionality). In this case, the UE may determine whether a slot is available or not based at least in part on an availability of an uplink beam or uplink spatial filter. In some examples, the available TCI state may be a configured or indicated TCI state for the multiple repetitions of the uplink transmission. Additionally, or alternatively, the TCI state may include multiple TCI states (e.g., in a unified TCI states example, in which there are different uplink TCI states for each duplex mode, or in a case in which the UE 120 receives scheduling or configuration information indicating a plurality of TCI states associated with duplex mode operation). In some aspects, when the uplink transmissions are associated with a PUSCH message, the UE 120 receive downlink control information (DCI) that includes up to two sounding reference signal (SRS) resource indicators (SRIs) mapping to SRS resources in SBFD and non-SBFD symbols associated with the PUSCH repetitions across the SBFD and non-SBFD symbols respectively. Alternatively, when a TCI state is not available (e.g., the UE 120 has received a single indicated TCI state and the UE 120 does not support unified TCI states or the TCI is restricted in the SBFD symbols), the UE 120 may forgo transmitting in a slot. Additionally, or alternatively, the UE 120 may forgo incrementing a hybrid automatic repeat request (HARQ) process identifier (ID) associated with transmitting.

Figure 6B:
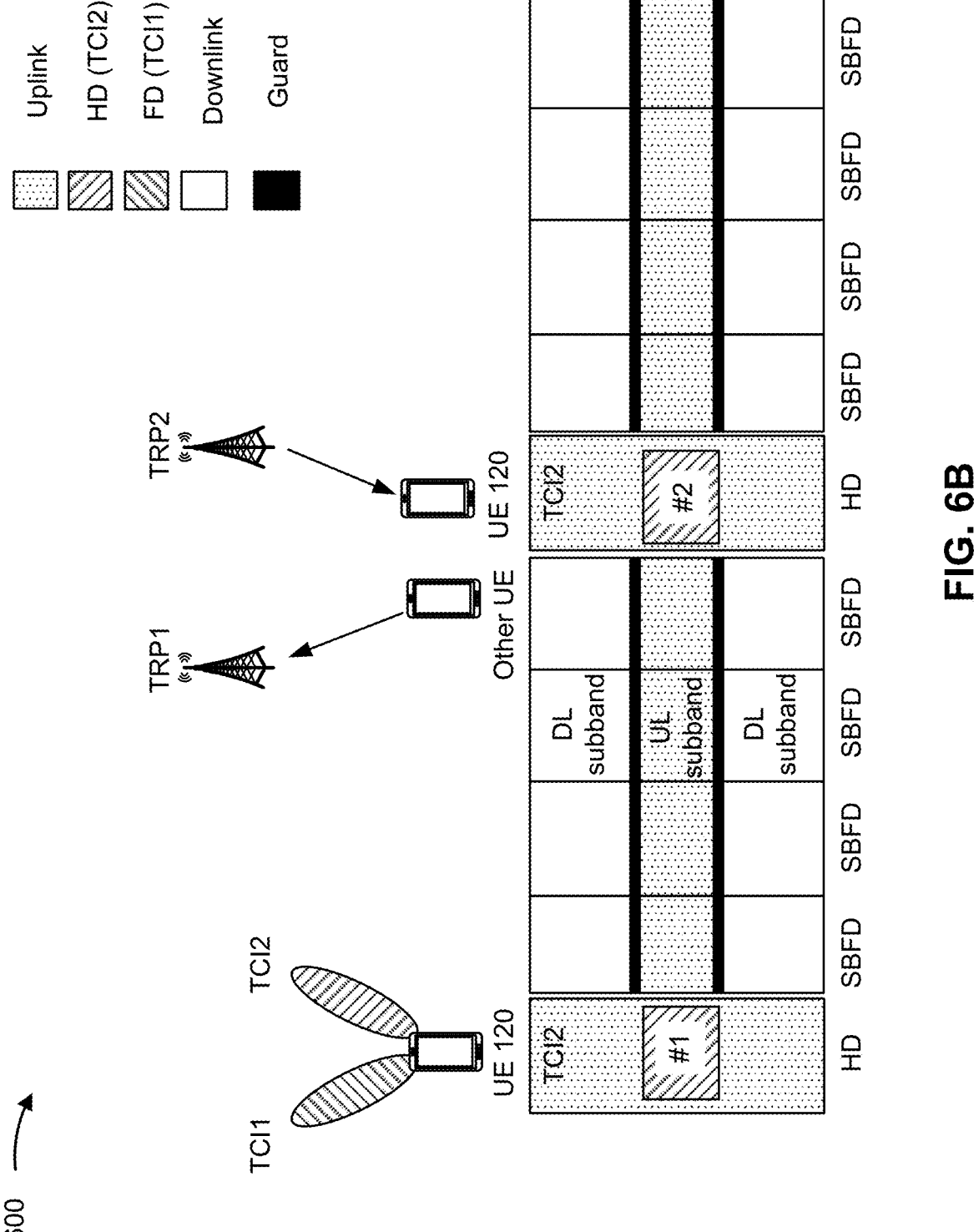

FIG. 6B shows an example in which the UE 120 is scheduled to transmit a PUSCH or a PUCCH communication. As shown, this example may include PUSCH repetition of a same TB or a single DCI scheduling multiple PUSCHs (e.g., multiple TBs) across SBFD and non-SBFD symbols. In this example, the TRP2 (e.g., of the network node 110) is a best TRP for the UE 120, but the beam, TCI2, is not available for uplink in SBFD slots. In this case, the UE 120 treats the SBFD slots as not available for uplink transmission and does not transmit an uplink repetition in case of PUSCH repetition or increment a HARQ process ID for the PUSCHs in SBFD symbols.

Figure 6C:
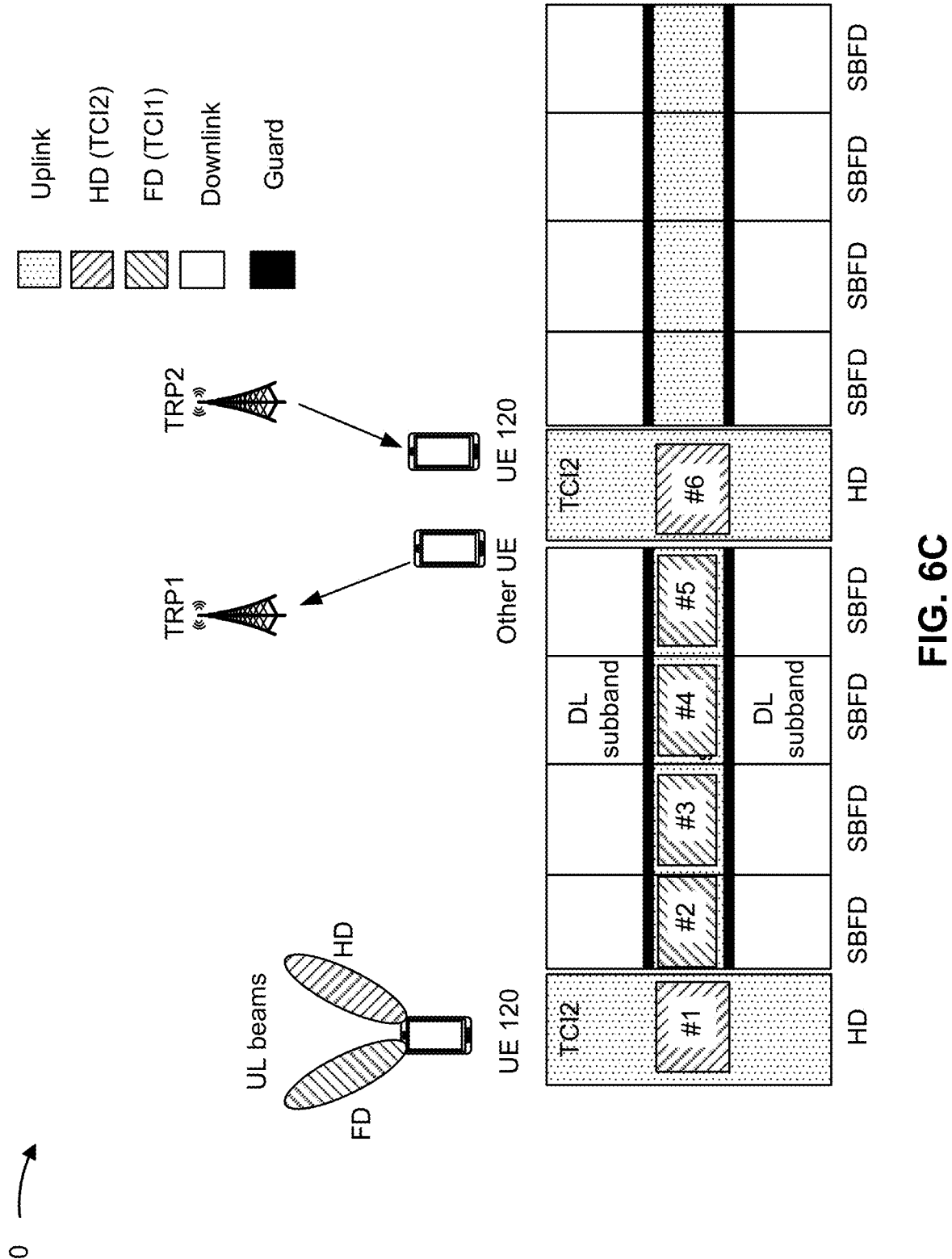
Figure 6D:
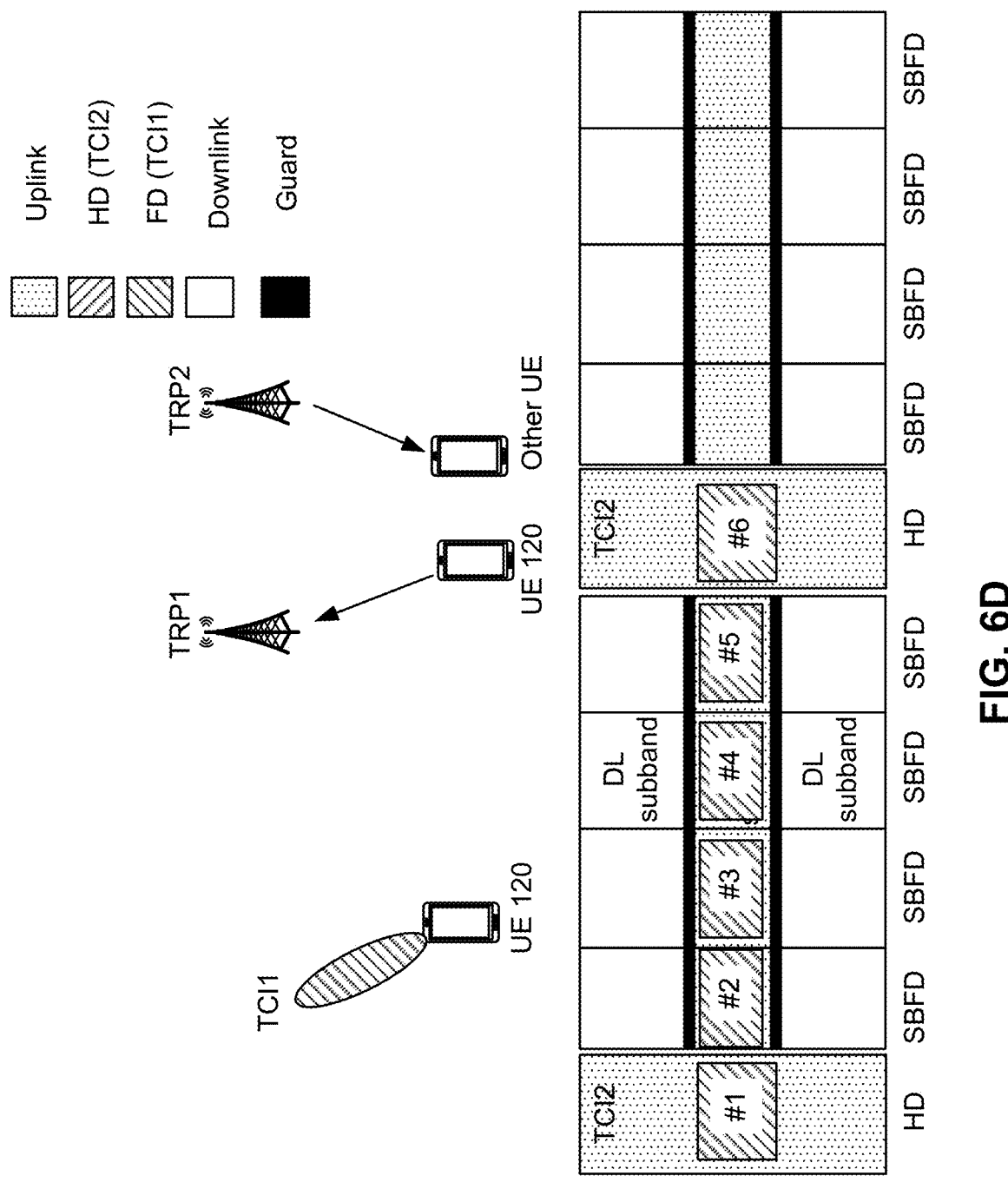

In contrast, in FIG. 6C, when the UE 120 supports the unified TCI framework (or is configured or indicated with more than one uplink beam, such as having duplex-specific spatial relationship information, as described herein), the UE 120 may switch to a different beam at SBFD slots to enable the UE 120 to transmit on an uplink in the SBFD slots. In other words, the UE 120 may use half-duplex TCI2 during uplink-only slots #1 and #6, but may use full-duplex TCI1 for uplink transmission during SBFD slots #2 through #5. In contrast, in the example of FIG. 6B, the UE 120 is only configured with half-duplex TCI2, but cannot use half-duplex TCI2 for uplink transmission in the SBFD slots. In another example, as shown in FIG. 6D, when the UE 120 is configured with full-duplex TCI1 and TRP1 is a best TRP for UE 120 to use for uplink transmission, the UE 120 may use TCI1 for both half-duplex (e.g., non-SBFD slots) and full-duplex (e.g., SBFD) slots.

In some aspects, the UE 120 may support duplex-specific extensions to the unified TCI framework. For example, the UE 120 may support duplex-specific configured grants (CGs). In this case, the network node 110 may transmit configuration information configuring duplex-specific CGs. For example, a dedicated CG for PUSCH transmission in SBFD symbols and another dedicated CG for PUSCH transmission in non-SBFD symbols. When the UE 120 supports the duplex-specific extended unified TCI framework, the UE 120 may use an uplink TCI state of a corresponding duplex mode when a duplex type of transmission occasion occurs. In other words, when the UE 120 receives an SBFD uplink TCI state and a configured grant for an SBFD mode, the UE 120 may use the SBFD uplink TCI state. In contrast, when the UE 120 does not support the unified TCI framework, the UE 120 may map an SRI to a sounding reference signal (SRS) resource set associated with the same duplex mode as the duplex-specific CG occasion that is occurring. This example may be applicable when CG transmission occasions associated with a different duplex mode than the duplex-specific CG occasion are to be dropped.

In contrast, another scenario, the network node 110 may utilize the same CG for PUSCH transmission across SBFD and non-SBFD symbols which the UE 120 is configured with two sets of parameters for the different duplex modes and the UE 120 is configured to select a set of parameters based at least in part on a slot of a transmission occasion. In this case, when the UE 120 does not support the unified TCI framework and a single configured grant is configured across different duplex modes, the UE 120 can be configured with two SRIs that map to two SRS resource sets for the different duplex modes. As a result, the UE 120 can select an SRI mapping to an SRS resource set of the duplex mode for which a configured grant occasion is occurring. Additionally, or alternatively, the UE 120 may be configured with two transmission precoding matrix indicators (TPMIs) or two ranks, among other parameters, corresponding to the two SRIs and the two SRS resource sets.

In some aspects, when the UE 120 is configured for persistent or semi-persistent PUCCH transmission, the UE 120 may be configured with two PUCCH spatial relationship information parameters for the two duplex modes (e.g., via RRC signaling of a parameter associated with the two duplex modes). Additionally, or alternatively, the UE 120 may be configured with more than two PUCCH spatial relationship information parameters (e.g., via RRC signaling from network node 110) and may receive an activation or selection of two PUCCH spatial relationship parameters, of the more than two PUCCH spatial relationship parameters (e.g., via medium access control (MAC) control element (CE) signaling), for the two duplex modes. Additionally, or alternatively, the UE 120 may be configured with other parameters, in connection with the PUCCH spatial relationship parameters, such as power control parameters that are differentiated for the two duplex modes. If a PUCCH resource is configured or activated with only one PUCCH spatial relationship parameter and is not available for SBFD transmission, the UE 120 may drop the PUCCH transmission.

Figure 6E:
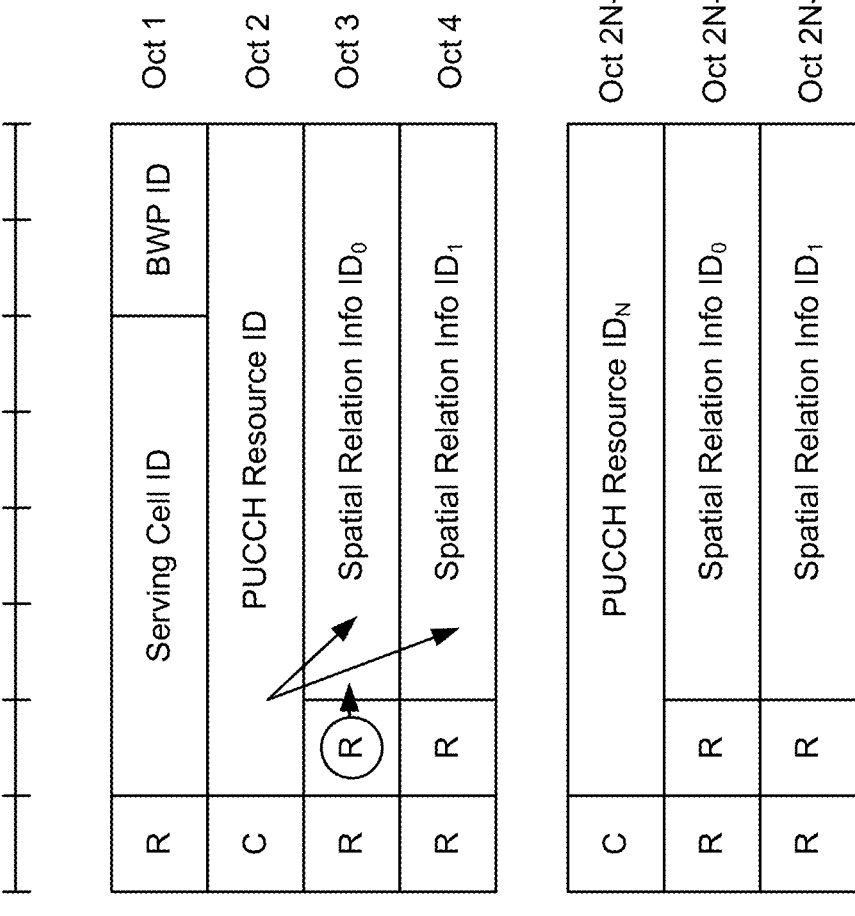
Figure 6F:
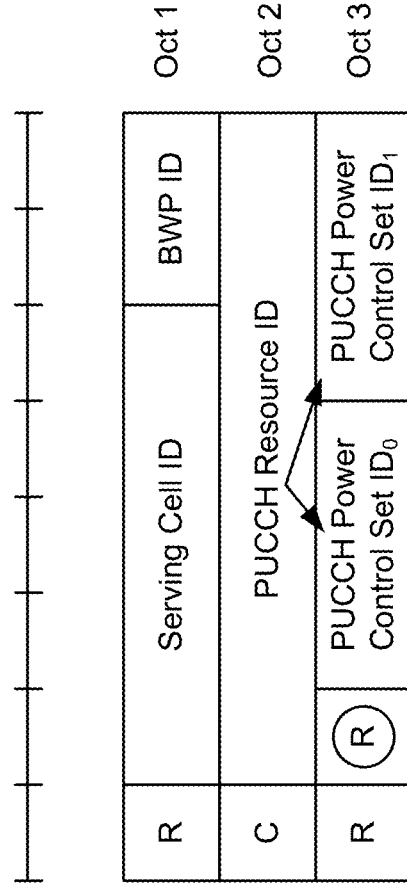

FIG. 6E shows an example of a configuration message identifying a set of spatial relationship parameters. For example, the configuration message may include a PUCCH resource ID for the PUCCH transmission and two spatial relationship parameters (Spatial Relationship Info $ID_0$ and $ID_1$) for the two duplex modes (SBFD and non-SBFD). In this case, the network node 110 may use a reserved bit to indicate a duplex mode that is associated with each spatial relationship parameter. Similarly, as shown in FIG. 6F, other parameters can be associated with the two duplex modes for the PUCCH Resource ID, such as a PUCCH power control parameter (PUCCH Power Control Set $ID_0$ and $ID_1$).

In some aspects, when the UE 120 is configured for persistent or semi-persistent SRS transmission, the UE 120 may receive spatial relationship information associated with an SRS resource. For example, the UE 120 may receive, from the network node 110, two SRS spatial relationship parameters associated with the two duplex modes. In this case, the UE 120 may associate the two SRS spatial relationship parameters with the two duplex modes based at least in part on an explicit RRC parameter or an order within a configuration message. Additionally, or alternatively, when the UE 120 receives only a single SRS spatial relationship information parameter, the UE 120 may associate the single spatial relationship information parameter with two duplex modes or with a single duplex mode for a subset of slots. Additionally, or alternatively, the UE 120 may receive RRC configuration information (e.g., first signaling) identifying a plurality of SRS spatial relationship information parameters, and MAC-CE configuration information (e.g., second signaling) selecting or activating two SRS spatial relationship information parameters of the plurality of spatial relationship information parameters. In this case, the UE 120 may map a first SRS spatial relationship information parameter to non-SBFD SRS transmission and a second spatial relationship information parameter to SBFD SRS transmission. If an SRS resource is configured or activated with a single SRS spatial relationship information parameter that is not available for SBFD SRS transmission, then the UE 120 may drop SRS transmission in the SRS resource.

In some aspects, when the UE 120 is configured for transmission of a plurality of PUSCH communications, the UE 120 may receive spatial relationship information identifying a TCI state for a duplex mode for PUSCH transmission. For example, the UE 120 may receive a single DCI that schedules a plurality of PUSCH transmissions over a plurality of (consecutive) slots, with each PUSCH transmission being identified by a respective start and length indicator value (SLIV) and a common configuration (e.g., a modulation and coding scheme (MCS) or a frequency domain resource allocation (FDRA)). In this case, when the plurality of slots includes one or more SBFD slots and/or one or more non-SBFD slots and the UE 120 supports the duplex-specific extended unified TCI framework, the UE 120 may use, for transmission of each PUSCH transmission, an uplink TCI state of the corresponding duplex mode selected based at least in part on a duplex type of each PUSCH transmission occasion (e.g., as indicated by a respective SLIV). Alternatively, when the UE 120 does not support the duplex-specific extended unified TCI framework, the UE 120 may receive an activating or scheduling DCI that includes two TCI states for the two duplex types and may use a corresponding TCI state for a corresponding duplex type. If the UE 120 only receives a single TCI state via the DCI and the TCI state is not available in SBFD symbols, the UE 120 may drop transmission of a corresponding PUSCH transport block and may forgo incrementing a HARQ process ID.

Figure 6G:
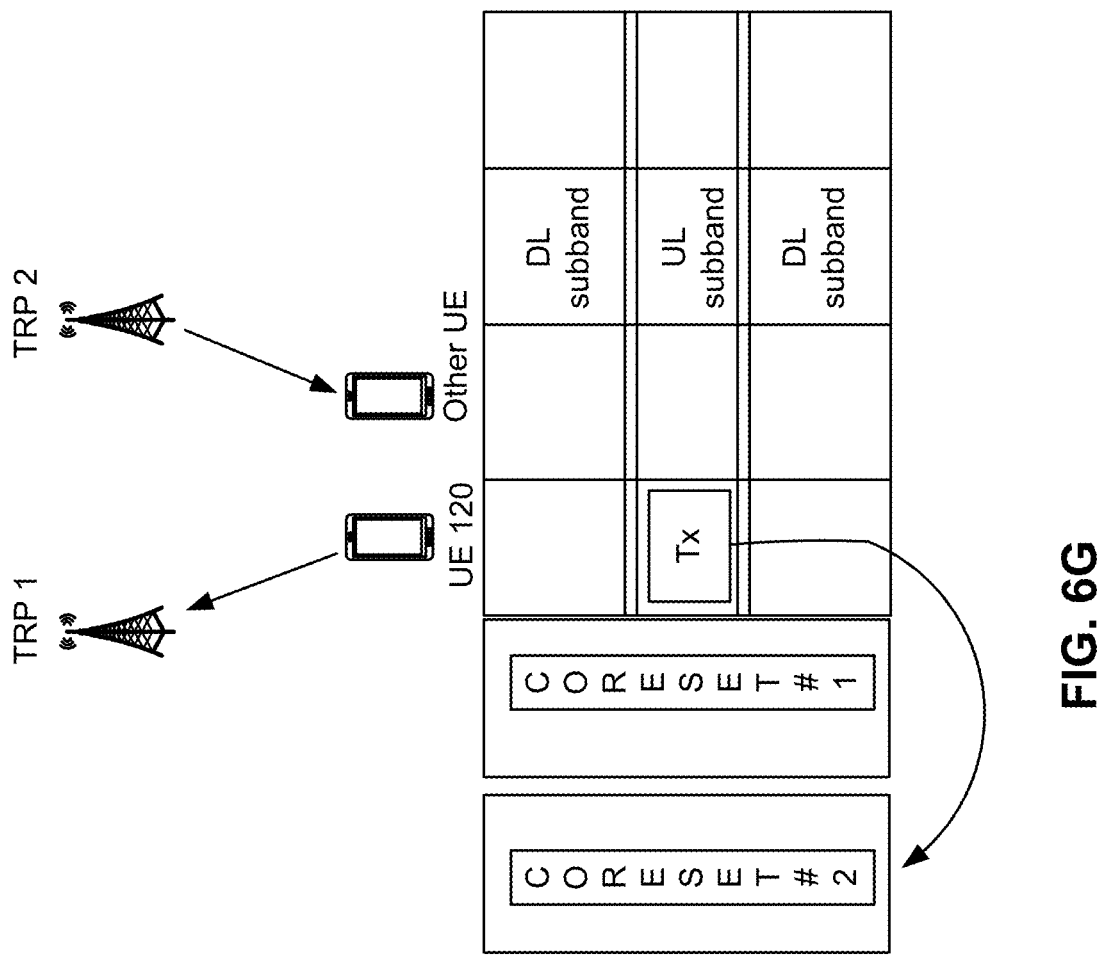
Figure 6G:

In some aspects, the UE 120 may use a default spatial relationship. For example, for PUCCH, PUSCH, or SRS transmission by an SBFD-aware UE 120 not supporting the unified TCI framework, the UE 120 may be configured with a default beam and pathloss reference signal. In this case, the UE 120 may determine the default beam and associated pathloss reference signal based at least in part on a TCI state of a lowest value control resource set (CORESET) identifier with an available TCI state in SBFD for uplink transmission. For example, as shown in FIG. 6G, the UE 120 may transmit, in a particular slot, using a TCI state associated with the CORESET 2 in a previous slot.

The UE 120 may use the default beam when the received spatial relationship information does not include an available beam, such as a DCI format 0_0, which schedules a PUSCH and which may not have PUCCH resources or a spatial setting for the PUCCH resources on an active bandwidth part. Similarly, the UE 120 may use the default beam for a PUCCH, when the UE 120 does not receive information identifying a pathloss reference signal or a PUCCH spatial relationship information parameter. Similarly, the UE 120 may use the default beam for an SRS when the UE 120 is not provided with a pathloss reference signal and a spatial relationship information parameter. In each of the above scenarios, the UE 120 may receive an indicator that the UE 120 can use the default beam for the scheduled communication for which the spatial relationship information does not provide a usable TCI state or beam.

Returning to FIG. 6A, and as shown by reference number 620, the UE 120 may communicate using the spatial relationship information. For example, the UE 120 may transmit one or more communications to a TRP of the network node 110 (e.g., the second TRP) and/or receive one or more communications from a TRP of the network node 110 (e.g., the first TRP) during an SBFD mode slot or symbol. Additionally, or alternatively, the UE 120 may transmit one or more communications to a TRP or receive one or more communications from a TRP in a non-SBFD mode slot or symbol.

As indicated above, FIGS. 6A-6G are provided as an example. Other examples may differ from what is described with respect to FIGS. 6A-6G.

Figure 7:
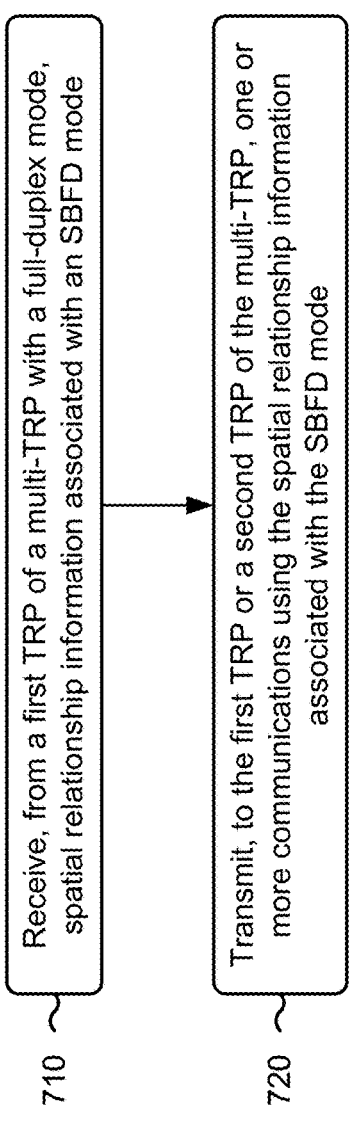
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for sub-band full-duplex mode aware communication.

As shown in FIG. 7, in some aspects, process 700 may include receiving, from a first TRP of a multi-TRP with a full-duplex mode, spatial relationship information associated with an SBFD mode (block 710). For example, the UE (e.g., using reception component 902 and/or communication manager 906, depicted in FIG. 9) may receive, from a first TRP of a multi-TRP with a full-duplex mode, spatial relationship information associated with an SBFD mode, as described above.

As further shown in FIG. 7, in some aspects, process 700 may include transmitting, to the first TRP or a second TRP of the multi-TRP, one or more communications using the spatial relationship information associated with the SBFD mode (block 720). For example, the UE (e.g., using transmission component 904 and/or communication manager 906, depicted in FIG. 9) may transmit, to the first TRP or a second TRP of the multi-TRP, one or more communications using the spatial relationship information associated with the SBFD mode, as described above. In some aspects, the UE may transit to the first TRP using a first beam and/or to the second TRP using a second beam. In some aspects, the first beam or the second beam may be based at least in part on the spatial relationship information.

Process 700 may include additional aspects, such as any single aspect or any combination of aspects described below and/or in connection with one or more other processes described elsewhere herein.

In a first aspect, the spatial relationship information is RRC or DG indicated spatial relationship information identifying a set of uplink channel repetitions, a first repetition, of the set of repetitions, being configured for one or more SBFD symbols in a first slot, and a second repetition, of the set of repetitions, being configured for one or more non-SBFD symbols in a second slot.

In a second aspect, the set of uplink channel repetitions includes at least one of a physical uplink control channel, a physical uplink shared channel, or a physical random access channel.

In a third aspect, a slot for transmission of the first repetition or the second repetition is an uplink slot or a flexible slot with a beam identified in connection with the spatial relationship information and is available for transmission based at least in part on an indicated beam being available.

In a fourth aspect, the spatial relationship information identifies, for the first repetition or the second repetition, one or more transmission configuration indicator (TCI) states associated with the duplex mode.

In a fifth aspect, the one or more TCI states includes a first TCI state for the one or more SBFD symbols and a second TCI state for the one or more non-SBFD symbols.

In a sixth aspect, wherein spatial relationship information identifies a single beam, and wherein the UE is configured to drop one or more repetitions in one or more slots in which a spatial direction of the single beam is not available.

In a seventh aspect, DCI scheduling or activating physical uplink shared channel transmission and conveying the spatial relationship information includes one or more spatial relationship indicators identified by one or more SRS resource indicator fields in the DCI, the one or more spatial relationship indicators mapping to the one or more communications for the duplex mode.

In an eighth aspect, the spatial relationship information includes a transmission configuration indicator state based at least in part on a type of duplex transmission configured for the one or more communications.

In a ninth aspect, the one or more communications include a physical uplink shared channel communication.

In a tenth aspect, the spatial relationship information includes a spatial relationship indicator mapping to a sounding reference signal resource set associated with the duplex mode.

In an eleventh aspect, the spatial relationship information includes a plurality of spatial relationship indicators mapped to a corresponding plurality of sounding reference signal resource sets associated with the duplex mode.

In a twelfth aspect, the spatial relationship information includes a set of transmit precoding matrix indicators associated with a set of ranks for the one or more communications.

In a thirteenth aspect, the UE is configured to drop at least one communication associated with the SBFD mode based at least in part on the spatial relationship information not being available for the at least one communication.

In a fourteenth aspect, the spatial relationship information includes a plurality of physical uplink control channel spatial relationship indicators associated with different duplex modes.

In a fifteenth aspect, the spatial relationship information includes first spatial relationship information identifying a plurality of physical uplink control channel spatial relationship indicators and second spatial relationship information activating a subset of the plurality of physical uplink control channel spatial relationship indicators.

In a sixteenth aspect, the spatial relationship information includes a plurality of sounding reference signal spatial relationship indicators associated with different duplex modes.

In a seventeenth aspect, the spatial relationship information includes first spatial relationship information identifying a plurality of sounding reference signal spatial relationship indicators and second spatial relationship information activating a subset of the plurality of sounding reference signal spatial relationship indicators.

In an eighteenth aspect, a first sounding reference signal spatial relationship indicator, of the plurality of sounding reference signal spatial relationship indicators, maps to a non-SBFD transmission, and a second sounding reference signal spatial relationship indicator, of the plurality of sounding reference signal spatial relationship indicators, maps to an SBFD transmission of the one or more communications.

In a nineteenth aspect, the spatial relationship information is conveyed in a single downlink control information message scheduling or activating a plurality of physical uplink shared channels and includes a transmission configuration indicator state that is based at least in part on a duplex type of a transmission occasion for a transmission of the one or more communications.

In a twentieth aspect, the spatial relationship information includes a transmission configuration indicator state for each slot-duplex type of a set of slot-duplex types.

In a twenty-first aspect, DCI indicates a single beam, wherein the UE is configured to drop a PUSCH transmission in one or more SBFD symbols where the single beam is not available, and wherein a HARQ process ID is not incremented in connection with the PUSCH transmission.

In a twenty-second aspect, a default beam or a pathloss reference signal of the one or more communications is based at least in part on a transmission configuration state associated with a lowest control resource set identifier with an available transmission configuration state in the SBFD mode for uplink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
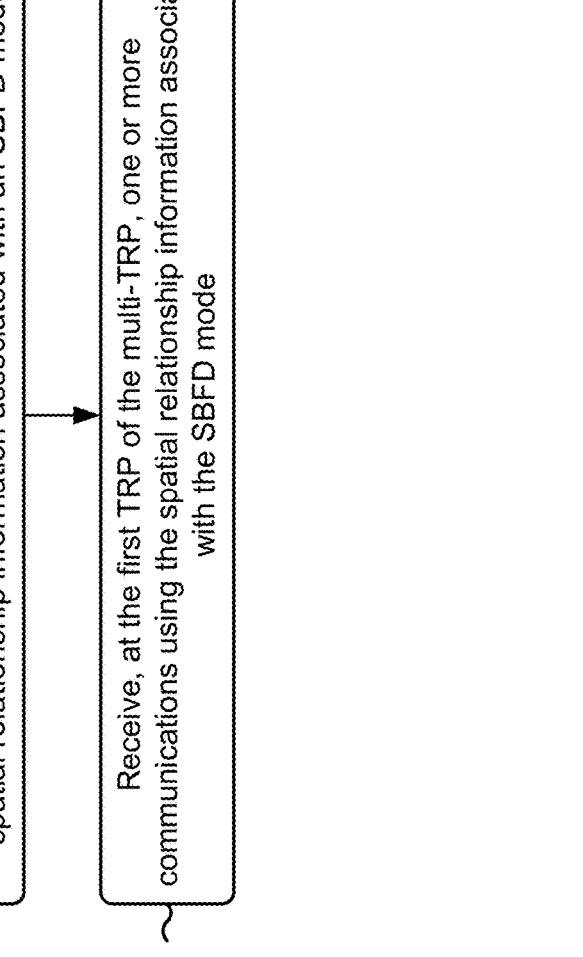
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., network node 110) performs operations associated with techniques for SBFD mode aware communication.

As shown in FIG. 8, in some aspects, process 800 may include transmitting, using a first TRP of a multi-TRP with a full-duplex mode, spatial relationship information associated with an SBFD mode (block 810). For example, the network node (e.g., using transmission component 1004 and/or communication manager 1006, depicted in FIG. 10) may transmit, using a first transmit receive point (TRP) of a multi-TRP with a full-duplex mode, spatial relationship information associated with an SBFD mode, as described above.

As further shown in FIG. 8, in some aspects, process 800 may include receiving, at the first TRP of the multi-TRP, one or more communications using the spatial relationship information associated with the SBFD mode (block 820). For example, the network node (e.g., using reception component 1002 and/or communication manager 1006, depicted in FIG. 10) may receive, at the first TRP of the multi-TRP, one or more communications using the spatial relationship information associated with the SBFD mode, as described above.

Process 800 may include additional aspects, such as any single aspect or any combination of aspects described below and/or in connection with one or more other processes described elsewhere herein.

In a first aspect, the spatial relationship information is RRC or DG indicated spatial relationship information identifying a set of uplink channel repetitions, a first repetition, of the set of repetitions, being configured for one or more SBFD symbols in a first slot and a second repetition, of the set of repetitions, being configured for one or more non-SBFD symbols in a second slot.

In a second aspect, the set of uplink channel repetitions includes at least one of a physical uplink control channel, a physical uplink shared channel, or a physical random access channel.

In a third aspect, a slot for transmission of the first repetition or the second repetition is an uplink slot or a flexible slot with a beam identified in connection with the spatial relationship information and is available for transmission based at least in part on an indicated beam being available.

In a fourth aspect, the spatial relationship information identifies, for the first repetition or the second repetition, one or more TCI states associated with the duplex mode.

In a fifth aspect, the one or more TCI states includes a first TCI state for the one or more SBFD symbols and a second TCI state for the one or more non-SBFD symbols.

In a sixth aspect, when spatial relationship information identifies a single beam, one or more repetitions in one or more slots in which a spatial direction of the single beam is not available are dropped.

In a seventh aspect, DCI scheduling or activating physical uplink shared channel transmission and conveying the spatial relationship information includes one or more spatial relationship indicators identified by one or more SRS resource indicator fields in the DCI, the one or more spatial relationship indicators mapping to the one or more communications for the duplex mode.

In an eighth aspect, the spatial relationship information includes a transmission configuration indicator state based at least in part on a type of duplex transmission configured for the one or more communications.

In a ninth aspect, the one or more communications include a physical uplink shared channel communication.

In a tenth aspect, the spatial relationship information includes a spatial relationship indicator mapping to a sounding reference signal resource set associated with the duplex mode.

In an eleventh aspect, the spatial relationship information includes a plurality of spatial relationship indicators mapped to a corresponding plurality of sounding reference signal resource sets associated with the duplex mode.

In a twelfth aspect, the spatial relationship information includes a set of transmit precoding matrix indicators associated with a set of ranks for the one or more communications.

In a thirteenth aspect, at least one communication associated with the SBFD mode is dropped based at least in part on the spatial relationship information not being available for the at least one communication.

In a fourteenth aspect, the spatial relationship information includes a plurality of physical uplink control channel spatial relationship indicators associated with different duplex modes.

In a fifteenth aspect, the spatial relationship information includes first spatial relationship information identifying a plurality of physical uplink control channel spatial relationship indicators and second spatial relationship information activating a subset of the plurality of physical uplink control channel spatial relationship indicators.

In a sixteenth aspect, the spatial relationship information includes a plurality of sounding reference signal spatial relationship indicators associated with different duplex modes.

In a seventeenth aspect, the spatial relationship information includes first spatial relationship information identifying a plurality of sounding reference signal spatial relationship indicators and second spatial relationship information activating a subset of the plurality of sounding reference signal spatial relationship indicators.

In an eighteenth aspect, a first sounding reference signal spatial relationship indicator, of the plurality of sounding reference signal spatial relationship indicators, maps to a non-SBFD transmission, and a second sounding reference signal spatial relationship indicator, of the plurality of sounding reference signal spatial relationship indicators, maps to an SBFD transmission of the one or more communications.

In a nineteenth aspect, the spatial relationship information is conveyed in a single downlink control information message scheduling or activating a plurality of physical uplink shared channels and includes a transmission configuration indicator state that is based at least in part on a duplex type of a transmission occasion for a transmission of the one or more communications.

In a twentieth aspect, the spatial relationship information includes a transmission configuration indicator state for each slot-duplex type of a set of slot-duplex types.

In a twenty-first aspect, DCI indicates a single beam, wherein a PUSCH transmission in one or more SBFD symbols where the single beam is not available is dropped, and wherein a HARQ process ID is not incremented in connection with the PUSCH transmission.

In a twenty-second aspect, a default beam or a pathloss reference signal of the one or more communications is based at least in part on a transmission configuration state associated with a lowest control resource set identifier with an available transmission configuration state in the SBFD mode for uplink transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
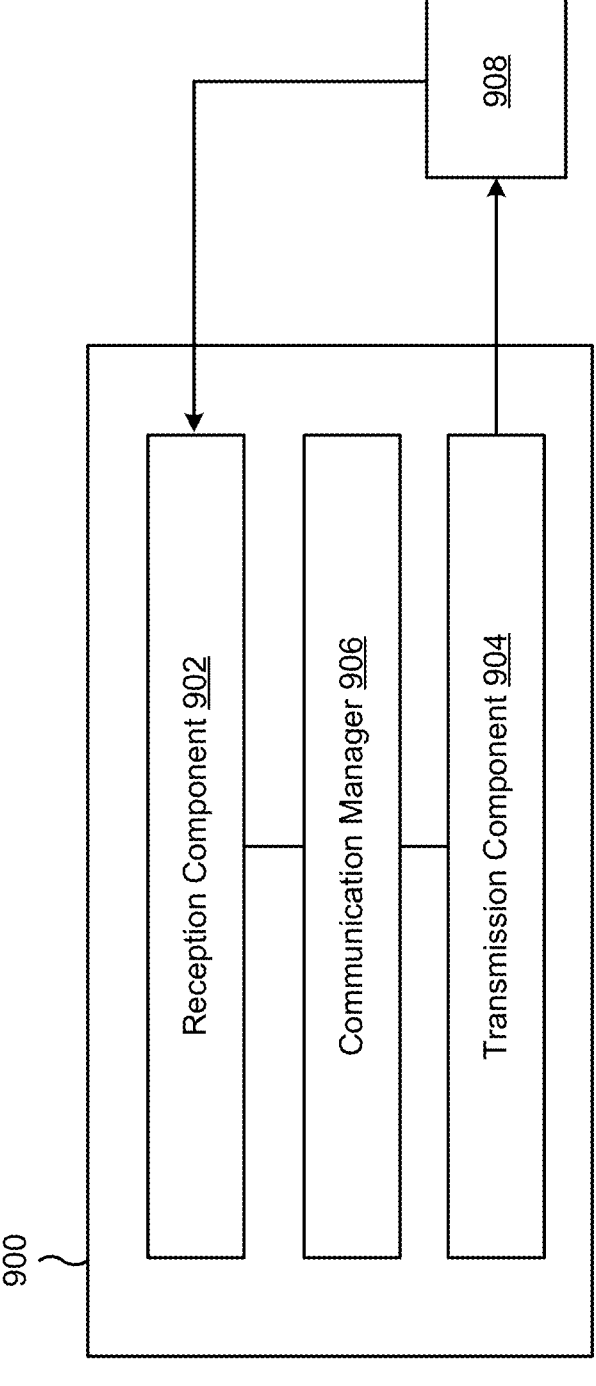
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 6A-6G. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive, from a first TRP of a multi-TRP with a full-duplex mode, spatial relationship information associated with an SBFD mode. The transmission component 904 may transmit, to the first TRP or a second TRP of the multi-TRP, one or more communications using the spatial relationship information associated with the SBFD mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
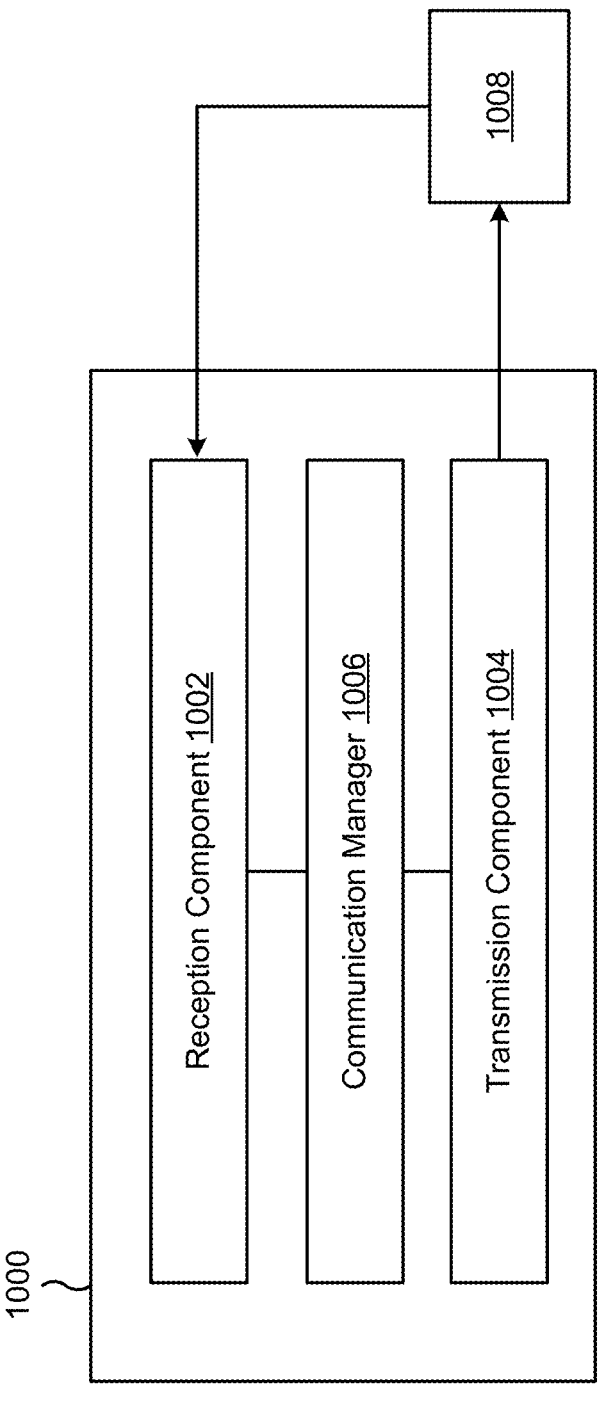
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6A-6G. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, using a first TRP of a multi-TRP with a full-duplex mode, spatial relationship information associated with an SBFD mode. The reception component 1002 may receive, at the first TRP of the multi-TRP, one or more communications using the spatial relationship information associated with the SBFD mode.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a first transmit receive point (TRP) of a multi-TRP with a full-duplex mode, spatial relationship information associated with a sub-band full-duplex (SBFD) mode; and transmitting, to the first TRP or a second TRP of the multi-TRP, one or more communications using the spatial relationship information associated with the SBFD mode.

Aspect 2: The method of Aspect 1, wherein the spatial relationship information is radio resource control (RRC) or dynamic grant (DG) indicated spatial relationship information identifying a set of uplink channel repetitions, a first repetition, of the set of repetitions, being configured for one or more SBFD symbols in a first slot and a second repetition, of the set of repetitions, being configured for one or more non-SBFD symbols in a second slot.

Aspect 3: The method of Aspect 2, wherein the set of uplink channel repetitions includes at least one of physical uplink control channel, a physical uplink shared channel, or a physical random access channel.

Aspect 4: The method of Aspect 2, wherein a slot for transmission of the first repetition or the second repetition is an uplink slot or a flexible slot with a beam identified in connection with the spatial relationship information and is available for transmission based at least in part on an indicated beam being available.

Aspect 5: The method of Aspect 2, wherein the spatial relationship information identifies, for the first repetition or the second repetition, one or more transmission configuration indicator (TCI) states associated with the duplex mode.

Aspect 6: The method of Aspect 5, wherein the one or more TCI states includes a first TCI state for the one or more SBFD symbols and a second TCI state for the one or more non-SBFD symbols.

Aspect 7: The method of Aspect 5, wherein when spatial relationship information identifies a single beam, and the UE is configured to drop one or more repetitions in one or more slot in which a spatial direction of the single beam is not available.

Aspect 8: The method of Aspect 5, wherein downlink control information (DCI) scheduling or activating physical uplink shared channel transmission and conveying the spatial relationship information includes one or more spatial relationship indicators identified by one or more SRS resource indicator fields in the DCI, the one or more spatial relationship indicators mapping to the one or more communications for the duplex mode.

Aspect 9: The method of any of Aspects 1-8, wherein the spatial relationship information includes a transmission configuration indicator state based at least in part on a type of duplex transmission configured for the one or more communications.

Aspect 10: The method of any of Aspects 1-9, wherein the one or more communications include a physical uplink shared channel communication.

Aspect 11: The method of Aspect 10, wherein the spatial relationship information includes a spatial relationship indicator mapping to a sounding reference signal resource set associated with the duplex mode.

Aspect 12: The method of Aspect 10, wherein the spatial relationship information includes a plurality of spatial relationship indicators mapped to a corresponding plurality of sounding reference signal resource sets associated with the duplex mode.

Aspect 13: The method of Aspect 10, wherein the spatial relationship information includes a set of transmit precoding matrix indicators associated with a set of ranks for the one or more communications.

Aspect 14: The method of Aspect 10, wherein the UE is configured to drop at least one communication associated with the SBFD mode based at least in part on the spatial relationship information not being available for the at least one communication.

Aspect 15: The method of Aspect 10, wherein the spatial relationship information includes a plurality of physical uplink control channel spatial relationship indicators associated with different duplex modes.

Aspect 16: The method of any of Aspects 1-15, wherein the spatial relationship information includes first spatial relationship information identifying a plurality of physical uplink control channel spatial relationship indicators and second spatial relationship information activating a subset of the plurality of physical uplink control channel spatial relationship indicators.

Aspect 17: The method of any of Aspects 1-16, wherein the spatial relationship information includes a plurality of sounding reference signal spatial relationship indicators associated with different duplex modes.

Aspect 18: The method of any of Aspects 1-17, wherein the spatial relationship information includes first spatial relationship information identifying a plurality of sounding reference signal spatial relationship indicators and second spatial relationship information activating a subset of the plurality of sounding reference signal spatial relationship indicators.

Aspect 19: The method of Aspect 18, wherein a first sounding reference signal spatial relationship indicator, of the plurality of sounding reference signal spatial relationship indicators, maps to a non-SBFD transmission, and a second sounding reference signal spatial relationship indicator, of the plurality of sounding reference signal spatial relationship indicators, maps to an SBFD transmission of the one or more communications.

Aspect 20: The method of any of Aspects 1-19, wherein the spatial relationship information is conveyed in a single downlink control information message scheduling or activating a plurality of physical uplink shared channels and includes a transmission configuration indicator state that is based at least in part on a duplex type of a transmission occasion for a transmission of the one or more communications.

Aspect 21: The method of Aspect 20, wherein the spatial relationship information includes a transmission configuration indicator state for each slot-duplex type of a set of slot-duplex types.

Aspect 22: The method of Aspect 21, wherein downlink control indicates single beam, and wherein the UE is configured to drop a physical uplink shared channel (PUSCH) transmission in one or more SBFD symbols where the single beam is not available, and wherein a hybrid automatic repeat request (HARQ) process identifier (ID) is not incremented in connection with the PUSCH transmission.

Aspect 23: The method of any of Aspects 1-22, wherein a default beam or a pathloss reference signal of the one or more communications is based at least in part on a transmission configuration state associated with a lowest control resource set identifier with an available transmission configuration state in the SBFD mode for uplink transmission.

Aspect 24: A method of wireless communication performed by a network node, comprising: transmitting, using a first transmit receive point (TRP) of a multi-TRP with a full-duplex mode, spatial relationship information associated with a sub-band full-duplex (SBFD) mode; and receiving, at the first TRP of the multi-TRP, one or more communications using the spatial relationship information associated with the SBFD mode.

Aspect 25: The method of Aspect 24, wherein the spatial relationship information is radio resource control (RRC) or dynamic grant (DG) indicated spatial relationship information identifying a set of uplink channel repetitions, a first repetition, of the set of repetitions, being configured for one or more SBFD symbols in a first slot and a second repetition, of the set of repetitions, being configured for one or more non-SBFD symbols in a second slot.

Aspect 26: The method of Aspect 25, wherein the set of uplink channel repetitions includes at least one of physical uplink control channel, a physical uplink shared channel, or a physical random access channel.

Aspect 27: The method of Aspect 25, wherein a slot for transmission of the first repetition or the second repetition is an uplink slot or a flexible slot with a beam identified in connection with the spatial relationship information and is available for transmission based at least in part on an indicated beam being available.

Aspect 28: The method of Aspect 25, wherein the spatial relationship information identifies, for the first repetition or the second repetition, one or more transmission configuration indicator (TCI) states associated with the duplex mode.

Aspect 29: The method of Aspect 28, wherein the one or more TCI states includes a first TCI state for the one or more SBFD symbols and a second TCI state for the one or more non-SBFD symbols.

Aspect 30: The method of Aspect 28, wherein when spatial relationship information identifies a single beam, and one or more repetitions in one or more slot in which a spatial direction of the single beam is not available are dropped.

Aspect 31: The method of Aspect 28, wherein downlink control information (DCI) scheduling or activating physical uplink shared channel transmission and conveying the spatial relationship information includes one or more spatial relationship indicators identified by one or more SRS resource indicator fields in the DCI, the one or more spatial relationship indicators mapping to the one or more communications for the duplex mode.

Aspect 32: The method of any of Aspects 24-31, wherein the spatial relationship information includes a transmission configuration indicator state based at least in part on a type of duplex transmission configured for the one or more communications.

Aspect 33: The method of any of Aspects 24-32, wherein the one or more communications include a physical uplink shared channel communication.

Aspect 34: The method of Aspect 33, wherein the spatial relationship information includes a spatial relationship indicator mapping to a sounding reference signal resource set associated with the duplex mode.

Aspect 35: The method of Aspect 33, wherein the spatial relationship information includes a plurality of spatial relationship indicators mapped to a corresponding plurality of sounding reference signal resource sets associated with the duplex mode.

Aspect 36: The method of Aspect 33, wherein the spatial relationship information includes a set of transmit precoding matrix indicators associated with a set of ranks for the one or more communications.

Aspect 37: The method of Aspect 33, wherein at least one communication associated with the SBFD mode is dropped based at least in part on the spatial relationship information not being available for the at least one communication.

Aspect 38: The method of Aspect 33, wherein the spatial relationship information includes a plurality of physical uplink control channel spatial relationship indicators associated with different duplex modes.

Aspect 39: The method of any of Aspects 24-38, wherein the spatial relationship information includes first spatial relationship information identifying a plurality of physical uplink control channel spatial relationship indicators and second spatial relationship information activating a subset of the plurality of physical uplink control channel spatial relationship indicators.

Aspect 40: The method of any of Aspects 24-39, wherein the spatial relationship information includes a plurality of sounding reference signal spatial relationship indicators associated with different duplex modes.

Aspect 41: The method of any of Aspects 24-40, wherein the spatial relationship information includes first spatial relationship information identifying a plurality of sounding reference signal spatial relationship indicators and second spatial relationship information activating a subset of the plurality of sounding reference signal spatial relationship indicators.

Aspect 42: The method of Aspect 41, wherein a first sounding reference signal spatial relationship indicator, of the plurality of sounding reference signal spatial relationship indicators, maps to a non-SBFD transmission, and a second sounding reference signal spatial relationship indicator, of the plurality of sounding reference signal spatial relationship indicators, maps to an SBFD transmission of the one or more communications.

Aspect 43: The method of any of Aspects 24-42, wherein the spatial relationship information is conveyed in a single downlink control information message scheduling or activating a plurality of physical uplink shared channels and includes a transmission configuration indicator state that is based at least in part on a duplex type of a transmission occasion for a transmission of the one or more communications.

Aspect 44: The method of Aspect 43, wherein the spatial relationship information includes a transmission configuration indicator state for each slot-duplex type of a set of slot-duplex types.

Aspect 45: The method of Aspect 44, wherein downlink control indicates single beam, and wherein a physical uplink shared channel (PUSCH) transmission in one or more SBFD symbols where the single beam is not available is dropped, and wherein a hybrid automatic repeat request (HARQ) process identifier (ID) is not incremented in connection with the PUSCH transmission.

Aspect 46: The method of any of Aspects 24-45, wherein a default beam or a pathloss reference signal of the one or more communications is based at least in part on a transmission configuration state associated with a lowest control resource set identifier with an available transmission configuration state in the SBFD mode for uplink transmission.

Aspect 47: An apparatus for wireless communication at a device, comprising a processor; memory coupled with the processor; and instructions stored in the memory and executable by the processor to cause the apparatus to perform the method of one or more of Aspects 1-46.

Aspect 48: A device for wireless communication, comprising a memory and one or more processors coupled to the memory, the one or more processors configured to perform the method of one or more of Aspects 1-46.

Aspect 49: An apparatus for wireless communication, comprising at least one means for performing the method of one or more of Aspects 1-46.

Aspect 50: A non-transitory computer-readable medium storing code for wireless communication, the code comprising instructions executable by a processor to perform the method of one or more of Aspects 1-46.

Aspect 51: A non-transitory computer-readable medium storing a set of instructions for wireless communication, the set of instructions comprising one or more instructions that, when executed by one or more processors of a device, cause the device to perform the method of one or more of Aspects 1-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

one or more memories; and one or more processors, coupled to the one or more memories, configured to:

receive, from a first transmit receive point (TRP) of a multi-TRP with a full-duplex mode, spatial relationship information associated with a sub-band full-duplex (SBFD) mode, wherein the spatial relationship information identifies a set of uplink channel repetitions, and wherein a first repetition, of the set of uplink channel repetitions, is configured for one or more SBFD symbols and a second repetition, of the set of uplink channel repetitions, is configured for one or more non-SBFD symbols; and transmit, to the first TRP or a second TRP of the multi-TRP, one or more communications using the spatial relationship information associated with the SBFD mode.

2. The UE of claim 1, wherein the spatial relationship information is radio resource control (RRC) or dynamic grant (DG) indicated spatial relationship information, wherein the one or more SBFD symbols are in a first slot, and wherein the one or more non-SBFD symbols are in a second slot.

3. The UE of claim 2, wherein the set of uplink channel repetitions includes at least one of physical uplink control channel, a physical uplink shared channel, or a physical random access channel.

4. The UE of claim 2, wherein a slot for transmission of the first repetition or the second repetition is an uplink slot or a flexible slot with a beam identified in connection with the spatial relationship information and is available for transmission based at least in part on an indicated beam being available.

5. The UE of claim 2, wherein the spatial relationship information identifies, for the first repetition or the second repetition, one or more transmission configuration indicator (TCI) states associated with the duplex mode.

6. The UE of claim 5, wherein the one or more TCI states includes a first TCI state for the one or more SBFD symbols and a second TCI state for the one or more non-SBFD symbols.

7. The UE of claim 5, wherein spatial relationship information identifies a single beam, and wherein the one or more processors are configured to drop one or more repetitions in one or more slots in which a spatial direction of the single beam is not available.

8. The UE of claim 5, wherein downlink control information (DCI), scheduling or activating physical uplink shared channel transmission and conveying the spatial relationship information, includes one or more spatial relationship indicators identified by one or more SRS resource indicator fields in the DCI, the one or more spatial relationship indicators mapping to the one or more communications for the duplex mode.

9. The UE of claim 1, wherein the spatial relationship information includes a transmission configuration indicator state based at least in part on a type of duplex transmission configured for the one or more communications.

10. The UE of claim 1, wherein the one or more communications include a physical uplink shared channel communication.

11. The UE of claim 10, wherein the spatial relationship information includes a spatial relationship indicator mapping to a sounding reference signal resource set associated with the duplex mode.

12. The UE of claim 10, wherein the spatial relationship information includes a plurality of spatial relationship indicators mapped to a corresponding plurality of sounding reference signal resource sets associated with the duplex mode.

13. The UE of claim 10, wherein the spatial relationship information includes a set of transmit precoding matrix indicators associated with a set of ranks for the one or more communications.

14. The UE of claim 10, wherein the one or more processors are further configured to drop at least one communication associated with the SBFD mode based at least in part on the spatial relationship information not being available for the at least one communication.

15. The UE of claim 10, wherein the spatial relationship information includes a plurality of physical uplink control channel spatial relationship indicators associated with different duplex modes.

16. The UE of claim 1, wherein the spatial relationship information includes first spatial relationship information identifying a plurality of physical uplink control channel spatial relationship indicators and second spatial relationship information activating a subset of the plurality of physical uplink control channel spatial relationship indicators.

17. The UE of claim 1, wherein the spatial relationship information includes a plurality of sounding reference signal spatial relationship indicators associated with different duplex modes.

18. The UE of claim 1, wherein the spatial relationship information includes first spatial relationship information identifying a plurality of sounding reference signal spatial relationship indicators and second spatial relationship information activating a subset of the plurality of sounding reference signal spatial relationship indicators.

19. The UE of claim 18, wherein a first sounding reference signal spatial relationship indicator, of the plurality of sounding reference signal spatial relationship indicators, maps to a non-SBFD transmission, and a second sounding reference signal spatial relationship indicator, of the plurality of sounding reference signal spatial relationship indicators, maps to an SBFD transmission of the one or more communications.

20. The UE of claim 1, wherein the spatial relationship information is conveyed in a single downlink control information message scheduling or activating a plurality of physical uplink shared channels and includes a transmission configuration indicator state that is based at least in part on a duplex type of a transmission occasion for a transmission of the one or more communications.

21. The UE of claim 20, wherein the spatial relationship information includes a transmission configuration indicator state for each slot-duplex type of a set of slot-duplex types.

22. The UE of claim 21, wherein downlink control information indicates a single beam, and wherein the one or more processors are further configured to drop a physical uplink shared channel (PUSCH) transmission in one or more SBFD symbols where the single beam is not available, and wherein a hybrid automatic repeat request (HARQ) process identifier (ID) is not incremented in connection with the PUSCH transmission.

23. The UE of claim 1, wherein a default beam or a pathloss reference signal of the one or more communications is based at least in part on a transmission configuration state associated with a lowest control resource set identifier with an available transmission configuration state in the SBFD mode for uplink transmission.

24. A network node for wireless communication, comprising:
 one or more memories; and
 one or more processors, coupled to the one or more memories, configured to:
  transmit, using a first transmit receive point (TRP) of a multi-TRP with a full-duplex mode, spatial relationship information associated with a sub-band full-duplex (SBFD) mode,
   wherein the spatial relationship information identifies a set of uplink channel repetitions, and wherein a first repetition, of the set of uplink channel repetitions, is configured for one or more SBFD symbols and a second repetition, of the set of uplink channel repetitions, is configured for one or more non-SBFD symbols; and
  receive, at the first TRP of the multi-TRP, one or more communications using the spatial relationship information associated with the SBFD mode.

25. The network node of claim 24, wherein the spatial relationship information is radio resource control (RRC) or dynamic grant (DG) indicated spatial relationship information, wherein the one or more SBFD symbols are in a first slot, and wherein the one or more non-SBFD symbols are in a second slot.

26. The network node of claim 25, wherein the set of uplink channel repetitions includes at least one of physical uplink control channel, a physical uplink shared channel, or a physical random access channel.

27. The network node of claim 25, wherein a slot for transmission of the first repetition or the second repetition is an uplink slot or a flexible slot with a beam identified in connection with the spatial relationship information and is available for transmission based at least in part on an indicated beam being available.

28. The network node of claim 25, wherein the spatial relationship information identifies, for the first repetition or the second repetition, one or more transmission configuration indicator (TCI) states associated with the duplex mode.

29. A method of wireless communication performed by a user equipment (UE), comprising:
 receiving, from a first transmit receive point (TRP) of a multi-TRP with a full-duplex mode, spatial relationship information associated with a sub-band full-duplex (SBFD) mode,
  wherein the spatial relationship information identifies a set of uplink channel repetitions, and
  wherein a first repetition, of the set of uplink channel repetitions, is configured for one or more SBFD symbols and a second repetition, of the set of uplink channel repetitions, is configured for one or more non-SBFD symbols; and
 transmitting, to the first TRP or a second TRP of the multi-TRP, one or more communications using the spatial relationship information associated with the SBFD mode.

30. A method of wireless communication performed by a network node, comprising:
 transmitting, using a first transmit receive point (TRP) of a multi-TRP with a full-duplex mode, spatial relationship information associated with a sub-band full-duplex (SBFD) mode,
  wherein the spatial relationship information identifies a set of uplink channel repetitions, and
  wherein a first repetition, of the set of uplink channel repetitions, is configured for one or more SBFD symbols and a second repetition, of the set of uplink channel repetitions, is configured for one or more non-SBFD symbols; and
 receiving, at the first TRP of the multi-TRP, one or more communications using the spatial relationship information associated with the SBFD mode.

* * * * *